United States Patent

Murakami

[11] Patent Number: 5,772,876
[45] Date of Patent: Jun. 30, 1998

[54] SEPARATING AGENT

[75] Inventor: Tatsushi Murakami, Hyogo, Japan

[73] Assignee: Daicel Chemical Industries, Ltd., Osaka, Japan

[21] Appl. No.: 933,920

[22] Filed: Sep. 22, 1997

Related U.S. Application Data

[63] Continuation of Ser. No. 583,062, filed as PCT/JP95/01355 Jul. 6, 1995, abandoned.

[30] Foreign Application Priority Data

Jul. 7, 1994 [JP] Japan ................................ 6-155596

[51] Int. Cl.$^6$ .................................................. B01D 15/08
[52] U.S. Cl. .................................. 210/198.2; 210/502.1; 210/635; 210/656; 502/404
[58] Field of Search .............................. 210/198.2, 502.1, 210/635, 656, 659, 198.3; 502/401, 404

[56] References Cited

U.S. PATENT DOCUMENTS

| Re. 34,457 | 11/1993 | Okamoto | 210/198.2 |
|---|---|---|---|
| 4,786,416 | 11/1988 | Yuki | 210/198.2 |
| 4,818,394 | 4/1989 | Okamoto | 210/198.2 |
| 4,846,968 | 7/1989 | Yuki | 210/198.2 |
| 4,861,872 | 8/1989 | Okamoto | 210/656 |
| 5,302,633 | 4/1994 | Kimata et al. | 523/218 |

FOREIGN PATENT DOCUMENTS

| 0 527 235 A1 | 2/1993 | European Pat. Off. | |
|---|---|---|---|
| 60-142930 | 7/1985 | Japan | 210/198.2 |
| 62-230740 | 10/1987 | Japan | 210/198.2 |
| 6-279476 | 10/1994 | Japan | 210/198.2 |
| 6-329561 | 11/1994 | Japan | 210/198.2 |

OTHER PUBLICATIONS

J. Am. Chem. Soc., vol. 106, No. 18, 1984, pp. 5357–5359.
Patent Abstracts of Japan, vol. 13, No. 532 (C–659), & JP–A–01 216943 (Mitsui Toatu Chem.), Aug. 30, 1989 English Abstract.
Patent Abstracts of Japan, vol. 17, No. 704 (C–1146) & JP–A–05 239103 (Daicel Chem.), Sep. 17, 1993 English Abstract.

*Primary Examiner*—Ernest G. Therkorn
*Attorney, Agent, or Firm*—Flynn, Thiel, Boutell & Tanis, P.C.

[57] ABSTRACT

A separating agent which comprises a polysaccharide derivative having an Mw/Mn (wherein Mw and Mn represent the weight-average molecular weight calculated as polystyrene and the number-average molecular weight calculated as polystyrene, respectively), which indicates the extent of molecular weight distribution, of 1 to 3.

When liquid chromatography is effected using this separating agent as a column packing, the base line is highly steady, various types of solvents can be used as the eluent, and low-molecular polysaccharide derivatives are not eluted.

9 Claims, No Drawings

SEPARATING AGENT

This application is a continuation of U.S. Ser. No. 08/583,062, filed as PCT/JP95/01355 Jul. 6, 1995, now abandoned.

FIELD OF THE INVENTION

The present invention relates to a separating agent useful for the optical resolution of racemic modifications.

DESCRIPTION OF THE RELATED ART

It has been known that a column packing comprising a polysaccharide derivative is useful as a separating agent for optical isomers [see Y. OKAMOTO, M. KAWASHIMA and K. HATADA, J. Am. Chem. Soc., 106, 53 to 57 (1984) and Japanese Patent Publication-B No. 63-12850]. The polysaccharide derivative exhibits an extremely high power of optical resolution of a racemic modification, and is usually supported on a silica gel and widely used for the analysis or separation and collection of optical isomers. However, the polysaccharide derivatives in the prior art have problems that polysaccharide derivatives having a low molecular weight are eluted from the column, since the derivatives have a broad molecular weight distribution, the steadiness of the base line is poor during the operation of the column and the range of the solvents usable as the eluent is narrow (namely, the types of the solvents are limited).

Therefore, an object of the present invention is to provide a separating agent comprising a polysaccharide derivative in which the base line is very steady during the operation of the column, low-molecular weight polysaccharide derivatives do not elute therefrom and various solvents (eluents) can be used therefor, at the same time.

SUMMARY OF THE INVENTION

The present inventor has made extensive investigations for developing a separating agent in which the advantageous properties polysaccharide derivatives have are maximally exhibited and the above-described problems are solved. As a result, the present inventor has attained the present invention which will be described below.

Thus, the present invention provides a separating agent which comprises a polysaccharide derivative having an Mw/Mn (wherein Mw and Mn represent the weight-average molecular weight calculated as polystyrene and the number-average molecular weight calculated as polystyrene, respectively), which indicates the extent of molecular weight distribution, of 1 to 3.

In other words, the present invention relates to a separating agent comprising a polysaccharide derivative having an Mw/Mn (Mw: the weight-average molecular weight; Mn: the number-average molecular weight (calculated as polystyrene)), which indicates the extent of molecular weight distribution, of 1 to 3.

A detailed description will now be made on the present invention.

DETAILED DESCRIPTION OF THE INVENTION

The polysaccharide used in the present invention may be any of a synthetic polysaccharide, a natural polysaccharide and a modified natural polysaccharide so far as it is optically active. As the polysaccharide, those having a high regularity in the bonding manner thereof are preferably used. Examples of the polysaccharides include β-1,4-glucan (cellulose), α-1,4-glucan (amylose, amylopectin), α-1,6-glucan (dextran), β-1,6-glucan (pustulan), β-1,3-glucan (curdlan, shizophyllan), α-1,3-glucan, β-1,2-glucan (crown gall polysaccharide), β-1,4-galactan, β-1,4-mannan, α-1,6-mannan, β-1,2-fructan (inulin), β-2,6-fructan (levan), β-1,4-xylan, β-1,3-xylan, β-1,4-chitosan, β-1,4-N-acetylchitosan (chitin), pullulan, agarose, alginic acid, α-cyclodextrin, β-cyclodextrin and γ-cyclodextrin. In addition, examples of the polysaccharides also include amylose-containing starches. Among them, preferred are cellulose, amylose, β-1,4-chitosan, chitin, β-1,4-mannan, β-1,4-xylan, inulin and curdlan since highly pure products can be easily obtained, and still more preferred are cellulose and amylose.

The average degree of polymerization (average number of pyranose ring or furanose ring contained in one molecule) of the polysaccharide in the present invention is preferably 5 or more, and still more preferably 10 or more. Although the upper limit of the average degree of polymerization of the polysaccharide is not particularly provided, it is preferably 500 or less, from the viewpoint of ease of handling.

The polysaccharide to be used as the starting material for the production of the polysaccharide derivative of the present invention is preferably monodisperse. Such a monodisperse polysaccharide can be obtained by synthesizing it by an enzymatic method. To use a natural polysaccharide as the starting material for the polysaccharide derivative of the present invention, it must be highly purified by fractionation, since it has a broad width of molecular weight distribution.

The polysaccharide derivative in the present invention is obtained by reacting a polysaccharide with a compound having a functional group reactive with the hydroxyl group of the polysaccharide by a well-known method. Namely, the polysaccharide derivative comprises a polysaccharide bonded to the above-described compound through an ester linkage, a urethane linkage or the like.

Examples of the compounds having a functional group reactive with the hydroxyl group include aliphatic, alicyclic, aromatic and heteroaromatic isocyanic acid derivatives, carboxylic acids, esters, acid halides, acid amides, halides, epoxides, aldehydes, alcohols, and other compounds each having a leaving group.

As the polysaccharide derivative, particularly preferred are ester derivatives and carbamate derivatives of polysaccharides.

A high-molecular substance is usually a mixture of homologous polymers. Namely, a high-molecular substance comprises numerous molecules having degrees of polymerization or molecular weights different from each other. The spread of the molecular weights of a high-molecular substance is called the molecular weight distribution, and the extent of the spread is represented by a molecular weight distribution curve. The average molecular weight is classified into weight-average molecular weight (Mw) and number-average molecular weight (Mn). When Ni molecules, each having a molecular weight of Mi, are present in a unit volume, Mw and Mn are defined by the following equations, respectively:

$$Mw = \Sigma(Mi^2 \cdot Ni)/\Sigma(Mi \cdot Ni), \text{ and}$$

$$Mn = \Sigma(Mi \cdot Ni)/\Sigma(Ni).$$

The polysaccharide derivative used in the present invention has a weight-average molecular weight (calculated as polystyrene) of preferably 1,000 to 500,000, still more preferably 20,000 to 500,000.

When the molecular weight distribution is broad, the ratio of the weight-average molecular weight to the number-average molecular weight, Mw/Mn, has a large value. Thus, this value indicates the extent of the molecular weight distribution. Additionally, as the molecular weight distribution of a high-molecular substance becomes more monodisperse, the Mw/Mn becomes closer to 1. The polysaccharide derivative of the present invention is characterized in that the width of the molecular weight distribution thereof is narrow. Specifically, its Mw/Mn is 1 to 3. When the polysaccharide derivative having an Mw/Mn in this range is used as the column packing for a liquid chromatographic column for the separation of optical isomers, no elution of low-molecular polysaccharide derivatives occurs and one of the objects of the present invention can be attained.

In order to use the polysaccharide derivative of the present invention as a column packing for liquid chromatography, it is packed in a column either as it is or after being supported on a support.

Since the column packing is preferably in the form of granules, the polysaccharide derivative is preferably crushed or shaped into beads, when it is used as the column packing as it is. The size of the particles, which varies depending on the size of the column to be used, i.e., into which the polysaccharide derivative is packed, is usually 1 μm to 10 mm, preferably 1 to 300 μm. In addition, the particles are preferably porous.

For improving the pressure resistance and preventing the shrinkage of the separating agent and for improving the number of theoretical plates, the polysaccharide derivative of the present invention is preferably supported on a support and used. The size (particle diameter) of a suitable support is usually 1 μm to 10 mm, and preferably 1 μm to 300 μm. The support is preferably porous, and, in such a case, the average pore diameter thereof is preferably 10 Å to 100 μm, still more preferably 50 to 50,000 Å. Examples of the materials for the support include inorganic substances such as silica gel and alumina and organic substances such as polystyrene and polyacrylamide. Preferred is silica gel.

During the use of a separating agent comprising the polysaccharide derivative of the present invention, low-molecular polysaccharide derivatives scarcely elute. Further, when the separating agent is packed in a column and used, the operation time in the optical resolution is remarkably reduced, since the base line is highly steady, in other words, since the stabilization time for the base line is short. Furthermore, although the types of the solvents usable as the eluent have been limited to hexane, ethanol, propanol, etc., in the conventional optical resolution, solvents other than those mentioned above, in addition to those mentioned above, are also usable as the eluent when the polysaccharide derivative of the present invention is used.

EXAMPLES

The present invention will now be illustrated with reference to the Examples in detail. However, the present invention is not limited by these Examples.

Example 1

<Synthesis of Polysaccharide Derivative>

2 g of a synthetic monodisperse amylose [Mw/Mn<1.1, Mw=24,848 (both Mw and Mn being calculated by the light scattering method/ultracentrifugal sedimentation equilibrium method)] was reacted with 17 g of 3,5-dimethylphenyl isocyanate in pyridine under heating for 30 hours. The obtained reaction product was poured into methanol under stirring to form a precipitate. The precipitate was recovered by filtration with a G4 glass filter. The obtained substance was washed with methanol twice, and then dried in vacuo at 80° C. for 5 hours. Chloroform and dimethylacetamide were added to the obtained product to completely dissolve the same. The obtained solution was poured again into methanol under stirring to form a precipitate. The precipitate was recovered by filtration with a G4 glass filter. The obtained substance was washed with methanol twice, and then dried in vacuo at 80° C. for 5 hours. Thus, amylose tris(3,5-dimethylphenyl carbamate) which was a purified product was obtained. The Mw/Mn of the product was 1.22, while the Mw thereof was 55,500 [both Mw and Mn being determined by the differential refractive index determination method (calculated as polystyrene)].

<Support of Polysaccharide Derivative on Silica Gel>

The above amylose tris(3,5-dimethylphenyl carbamate) was dissolved in a mixture of chloroform and dimethylacetamide. The obtained solution was uniformly sprinkled on a carbamoylated silica gel (manufactured by Daiso Co., Ltd., particle diameter: 7 μm, pore diameter: 1,000 Å) and then the solvent was distilled off. Thus, the amylose tris(3,5-dimethylphenylcarbamate) was supported on the silica gel.

<Preparation of Optical Resolution Column>

The separating agent comprising the amylose tris(3,5-dimethylphenyl carbamate) supported on the silica gel described above was packed in a stainless steel column having a length of 25 cm and an inner diameter of 0.46 cm by the slurry packing procedure. An optical resolution column was thus prepared.

<Evaluation of Performance of Optical Resolution Column>

An optical resolution experiment of trans-stilbene oxide as the reference compound was conducted by using the above-described optical resolution column. In the evaluation of the performance, JASCO 875-UV (manufactured by JASCO Corp.) was used, and the conditions wherein the eluent was a mixture of hexane and 2-propanol [90/10 (v/v)], a flow rate of 1.0 ml/min and a temperature of 25° C. were employed. The results are given in Table 1.

The definitions of the terms in the Table are as follows:

separation factor (α):

(volumetric proportion of more strongly adsorbed antipode)/(volumetric proportion of more weakly adsorbed antipode), resolution (Rs):

[2×(distance between peak of more strongly adsorbed antipode and peak of more weakly adsorbed antipode)]/(sum of band widths of both peaks), stabilization time for base line:

the time taken for the stabilization of the base line from the beginning of the passage of the eluent under such conditions that the base line is judged to have been stabilized when the base line is kept horizontal for 30 minutes with the sensitivity of the UV detector being 0.16 and the full scale of the recorder being 10 mV (for example, when the base line lies horizontal from 30 minutes after the beginning of the passage of the eluent, the stabilization time is 1 hour), and amount of elution:

the amount of the residue obtained by passing a mixture of hexane and ethanol [75/25 (v/v)] as an eluent through the column for 10 hours under such conditions that the flow rate is 1.0 ml/min and the temperature is 40° C., combining the eluates, and concentrating all of them.

Example 2

<Synthesis of Polysaccharide Derivative>

Amylose tris(3,5-dimethylphenyl carbamate) was obtained in the same manner as that of Example 1, except that a synthetic monodisperse amylose [Mw/Mn<1.1, Mw=27,603 (both Mw and Mn being calculated by the light scattering method/ultracentrifugal sedimentation equilibrium method)] was used. The Mw/Mn of the product was 1.25, while the Mw thereof was 54,300 [both Mw and Mn being determined by the differential refractive index determination method (calculated as polystyrene)].

<Support of Polysaccharide Derivative on Silica Gel>

The amylose tris(3,5-dimethylphenyl carbamate) described above was supported on the same silica gel as that used in Example 1 in the same manner as that of Example 1.

<Preparation of Optical Resolution Column>

An optical resolution column was prepared in the same manner as that of Example 1, except that the separating agent comprising the amylose tris(3,5-dimethylphenyl carbamate) supported on the silica gel described above was used.

<Evaluation of Performance of Optical Resolution Column>

An optical resolution experiment of trans-stilbene oxide as the reference compound was conducted with the use of the above-described optical resolution column in the same manner as that of Example 1. The results are given in Table 1.

Example 3

<Synthesis of Polysaccharide Derivative>

Amylose tris(3,5-dimethylphenyl carbamate) was obtained in the same manner as that of Example 1, except that a synthetic monodisperse amylose [Mw/Mn<1.1, Mw=52,268 (both Mw and Mn being calculated by the light scattering method/ultracentrifugal sedimentation equilibrium method)] was used. The Mw/Mn of the product was 1.47, while the Mw thereof was 159,300 [both Mw and Mn being determined by the differential refractive index determination method (calculated as polystyrene)].

<Support of Polysaccharide Derivative on Silica Gel>

The amylose tris(3,5-dimethylphenyl carbamate) described above was supported on the same silica gel as that used in Example 1 in the same manner as that of Example 1.

<Preparation of Optical Resolution Column>

An optical resolution column was prepared in the same manner as that of Example 1, except that the separating agent comprising the amylose tris(3,5-dimethylphenyl carbamate) supported on the silica gel descrived above was used.

<Evaluation of Performance of Optical Resolution Column>

An optical resolution experiment of trans-stilbene oxide as the reference compound was conducted with the use of the above-described optical resolution column in the same manner as that of Example 1. The results are given in Table 1.

<Determination of Amount of Elution of Low-Molecular Polysaccharide Derivative>

The separating agent comprising the amylose tris(3,5-dimethylphenyl carbamate) supported on the silica gel described above was packed in a stainless steel column having a length of 25 cm and an inner diameter of 1.0 cm by the slurry packing procedure. An optical resolution column for elution experiment was thus prepared.

By using the optical resolution column for elution experiment thus prepared, the amount of elution of low-molecular polysaccharide derivatives was determined the manner as described in the paragraph of the amount of elution in the column of the definition of the terms described above. The results are given in Table 1.

Example 4

<Synthesis of Polysaccharide Derivative>

Amylose tris(3,5-dimethylphenyl carbamate) was obtained in the same manner as that of Example 1, except that a synthetic monodisperse amylose [Mw/Mn<1.1, Mw=74,510 (both Mw and Mn being calculated by the light scattering method/ultracentrifugal sedimentation equilibrium method)] was used. The Mw/Mn of the product was 2.21, while Mw thereof was 367,600 [both Mw and Mn being determined by the differential refractive index determination method (calculated as polystyrene)].

<Support of Polysaccharide Derivative on Silica Gel>

The amylose tris(3,5-dimethylphenyl carbamate) described above was supported on the same silica gel as that used in Example 1 in the same manner as that of Example 1.

<Preparation of Optical Resolution Column>

An optical resolution column was prepared in the same manner as that of Example 1, except that the separating agent comprising the amylose tris(3,5-dimethylphenyl carbamate) supported on the silica gel described above was used.

<Evaluation of Performance of Optical Resolution Column>

An optical resolution experiment of trans-stilbene oxide as the reference compound was conducted with the use of the above-described optical resolution column in the same manner as that of Example 1. The results are given in Table 1.

Comparative Example 1

<Synthesis of Polysaccharide Derivative>

Amylose tris(3,5-dimethylphenyl carbamate) was obtained in the same manner as that of Example 1, except that a natural amylose having a broad molecular weight distribution was used. The Mw/Mn of the product was 5.29, while the Mw thereof was 272,700 [both Mw and Mn being determined by the differential refractive index determination method (calculated as polystyrene)].

<Support of Polysaccharide Derivative on Silica Gel>

The amylose tris(3,5-dmethylphenyl carbamate) described above was supported on the same silica gel as that used in Example 1 in the same manner as that of Example 1.

<Preparation of Optical Resolution Column>

An optical resolution column was prepared in the same manner as that of Example 1, except that the separating agent comprising the amylose tris(3,5-dimethylphenyl carbamate) supported on the silica gel described above was used.

<Evaluation of Performance of Optical Resolution Column>

An optical resolution experiment of trans-stilbene oxide as the reference compound was conducted with the use of the above-described optical resolution column in the same manner as that of Example 1. The results are given in Table 1.

<Determination of Amount of Elution of Low-Molecular Polysaccharide Derivative>

The separating agent comprising the amylose tris(3,5-dimethylphenyl carbamate) supported on the silica gel described above was packed in a stainless steel column having a length of 25 cm and an inner diameter of 1.0 cm by the slurry packing procedure. An optical resolution column for elution experiment was thus prepared.

By using the optical resolution column for elution experiment thus prepared, the amount of elution of low-molecular polysaccharide derivatives was determined in such a manner as that described in the paragraph of the amount of elution in the column of the definition of the terms described above. The results are given in Table 1.

TABLE 1

|  | Separation factor ($\alpha$) | Resolution (Rs) | Base line stabilization time (hr) | Amount of elution (mg) |
|---|---|---|---|---|
| Ex. 1 | 2.93 | 11.2 | 3.5 |  |
| Ex. 2 | 2.79 | 10.8 | 3.5 |  |
| Ex. 3 | 2.98 | 10.9 | 2.5 | 7.8 |
| Ex. 4 | 2.80 | 9.6 | 2.0 |  |
| Comp. Ex. 1 | 3.05 | 11.6 | 26.0 | 76.6 |

I claim:

1. A separating agent comprising an optically active polysaccharide derivative having a molecular weight distribution Mw/Mn of from 1 to 2.21, wherein Mw represents the weight-average molecular weight based on polystyrene and Mn represents the number-average molecular weight based on polystyrene.

2. The separating agent according to claim 1, wherein the polysaccharide derivative has a weight-average molecular weight, calculated as polystyrene, of 20,000 to 500,000.

3. The separating agent according to claim 1, wherein the polysaccharide derivative is an ester derivative thereof or a carbamate derivative thereof.

4. The separating agent according to claim 1, which further comprises a support, on which the polysaccharide derivative is supported.

5. The separating agent according to claim 4, wherein the support is a silica gel having a particle diameter of 1 $\mu$m to 10 mm and a pore diameter of 10 Å to 100 $\mu$m.

6. A column packing for liquid chromatography comprising the separating agent according to claim 4.

7. The separating agent according to claim 1, wherein the polysaccharide derivative is amylose tris (3,5-dimethylphenyl carbamate).

8. The separating agent according to claim 7, wherein the polysaccharide derivative has a Mw/Mn of from 1.22 to 2.21.

9. The separating agent according to claim 7, wherein the polysaccharide derivative is supported on a silica gel having a particle diameter of from 1 mm to 10 mm and a pore diameter of 10 Å to 100 $\mu$m.

* * * * *

(12) EX PARTE REEXAMINATION CERTIFICATE (7050th)
United States Patent
Murakami

(10) Number: US 5,772,876 C1
(45) Certificate Issued: Sep. 8, 2009

(54) SEPARATING AGENT

(76) Inventor: Tatsushi Murakami, 198-1, Okidai, Taishicho, Ibo-gun, Hyogo (JP)

Reexamination Request:
No. 90/009,419, Feb. 25, 2009

Reexamination Certificate for:
Patent No.: 5,772,876
Issued: Jun. 30, 1998
Appl. No.: 08/933,920
Filed: Sep. 22, 1997

Related U.S. Application Data

(63) Continuation of application No. 08/583,062, filed as application No. PCT/JP95/01355 on Jul. 6, 1995, now abandoned.

(30) Foreign Application Priority Data

Jul. 7, 1994 (JP) .............................................. 6-155596

(51) Int. Cl.
*B01J 20/30* (2006.01)
*B01J 20/32* (2006.01)

(52) U.S. Cl. .................. 210/198.2; 210/656; 210/502.1; 210/635

(58) Field of Classification Search ................ 210/198.2
See application file for complete search history.

(56) References Cited

FOREIGN PATENT DOCUMENTS

JP 62-195395 8/1987

*Primary Examiner*—Stephen Stein

(57) ABSTRACT

A separating agent which comprises a polysaccharide derivative having an Mw/Mn (wherein Mw and Mn represent the weight-average molecular weight calculated as as polystyrene and the number-average molecular weight calculated as polystyrene, respectively), which indicates the extent of molecular weight distribution, of 1 to 3.

When liquid chromatography is effected using this separating agent as a column packing, the base line is highly steady, various types of solvents can be used as the eluent, and low-molecular polysaccharide derivatives are not eluted.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 and 7–9 are determined to be patentable as amended.

Claims 5 and 6, dependent on an amended claim, are determined to be patentable.

New claim 10 is added and determined to be patentable.

1. A separating agent comprising an optically active [polysaccharide] *amylose* derivative having a molecular weight distribution Mw/Mn of 1 to 2.21, wherein Mw represents the weight-average molecular weight based on polystyrene and Mn represents the number-average molecular weight based on polystyrene.

2. The separating agent according to claim 1, wherein the [polysaccharide] *amylose* derivative has a weight-average molecular weight, calculated as polystyrene, of 20,000 to 500,000.

3. The separating agent according to claim 1, wherein the [polysaccharide] *amylose* derivative is an ester derivative thereof or a carbamate derivative thereof.

4. The separating agent according to claim 1, which further comprises a support, on which the [polysaccharide] *amylose* derivative is supported.

7. The separating agent according to claim 1, wherein the [polysaccharide] *amylose* derivative is amylose tris (3,5-dimethylphenyl carbamate).

8. The separating agent according to claim 7, wherein the [polysaccharide] *amylose* derivative has a Mw/Mn of from 1.22 to 2.21.

9. The separating agent according to claim 7, wherein the [polysaccharide] *amylose* derivative is supported on a silica gel having a particle diameter of from 1 [mm] *µm* to 10 mm and a pore diameter of 10 Å to 100 µm.

*10. The separating agent according to claim 1, wherein the amylose derivative has a weight-average molecular weight, calculated as polystyrene, of 54,300 to 500,000.*

\* \* \* \* \*